United States Patent Office 2,844,826
Patented July 29, 1958

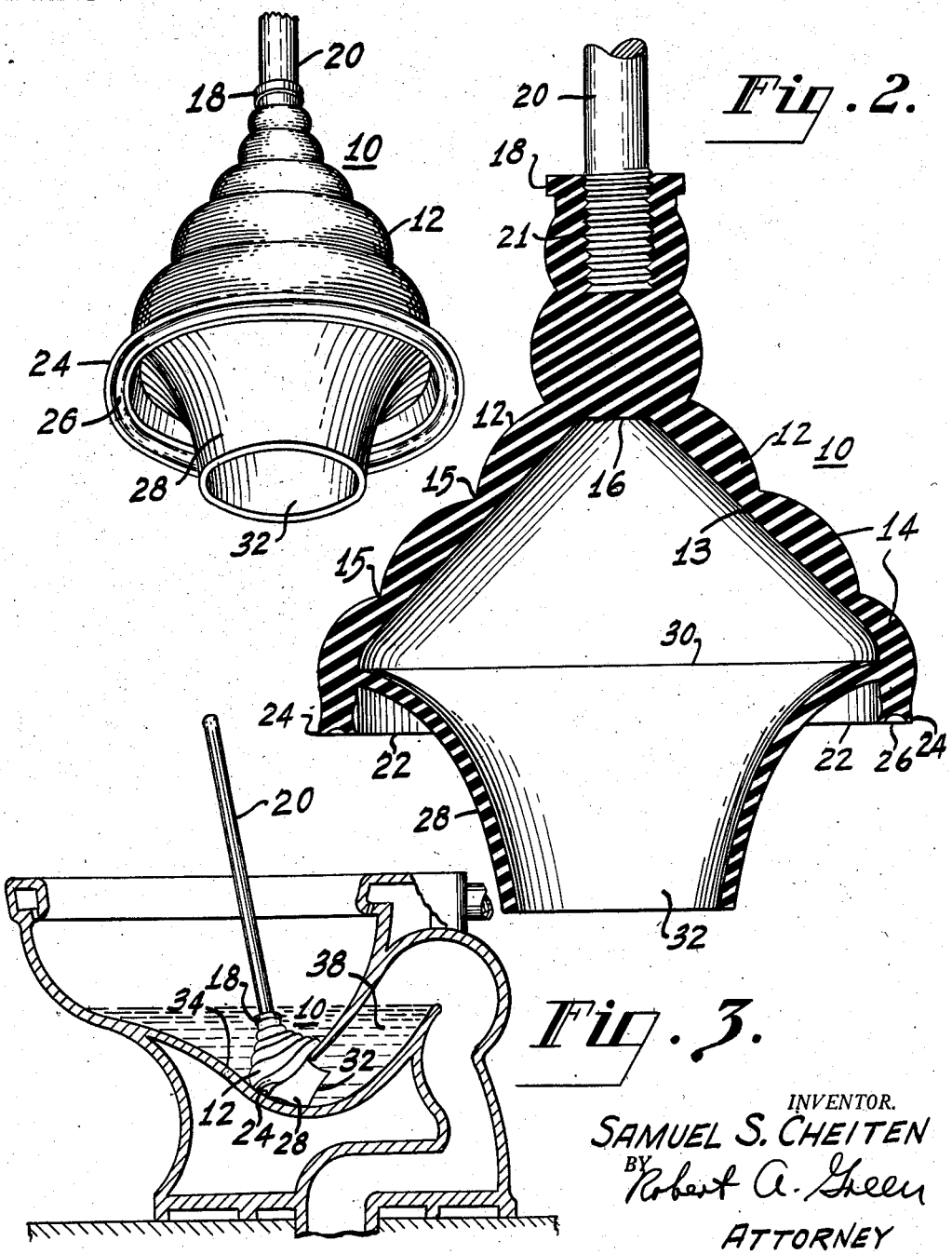

2,844,826
PRESSURE DEVICE

Samuel S. Cheiten, Highland Park, N. J.

Application August 3, 1954, Serial No. 447,525

1 Claim. (Cl. 4—257)

This invention relates to pressure devices and particularly to devices useful for applying an external force to an obstructed fluid flow line and thereby removing obstructions therefrom.

Pressure devices for freeing obstructed fluid flow lines, for example household plumbing lines, are known as force cups or plungers and comprise, in general, means for applying an external force upon the fluid in the obstructed line and thereby driving an obstruction therefrom. The most common type of force cup comprises a generally hemispherical bell-like member of rubber having a handle by means of which the force cup is positioned over the opening in the fluid flow line to be cleared. When the device has been properly positioned, a reciprocating force applied to the handle alternately compresses and expands the hemispherical bell and imposes pressure and suction forces alternately on the fluid in the flow line whereby the obstruction therein is removed.

One of the most important uses for a force cup or plunger of the above-described type is for freeing obstructed plumbing lines connected to hoppers in water closets. The hemispherical bell-type plunger is notably unsuited for performing this important function efficiently. The primary difficulty arises from the fact that such a plunger cannot accommodate to hopper trap openings of different sizes and shapes and, as a result, it cannot be accurately seated on the trap opening of the hopper before pressure is applied to the handle thereof. If the plunger is not properly seated when pressure is applied, backsplash of water and loss of pressure result and the obstruction cannot be removed. These unfortunate consequences of improper plunger seating are well known. The problem of improper seating results from the fact that the conventional plunger of the above-described type is not structurally designed to accommodate to any particular size and design of trap opening but is constructed as a compromise design for all trap openings. Further complicating the problem is the great variety in sizes and shapes of hopper traps and trap openings while plungers are made in substantially only one size and shape.

Another feature of the foregoing conventional plunger which limits its utility is its relatively small capacity which is determined by the diameter of the hemispherical bell. The capacity or volume of the plunger determines the amount of air which can be moved thereby into an obstructed line and the amount of air moved determines the efficiency of the plunger or force cup.

It would be desirable to increase the volume of this conventional plunger, however, the volume of this device is limited to a comparatively small critical value. If this critical volume is exceeded then, when the force cup is positioned over an obstructed line and compressed to apply a pressure force to the line, the hemispherical bell portion collapses and does not of itself expand and regain its shape on the suction portion of the operating cycle. Thus, the device becomes inoperative and can be returned to its normal shape only by hand.

Accordingly, an important object of this invention is to provide a novel force cup of new and improved form.

Another object of the invention is to provide an improved force cup capable of improved seating in a plumbing line and operable with considerably reduced likelihood of back-splash and loss of pressure.

Still another object of the invention is to provide a plunger having increased capacity and adjustability to different sizes and shapes of fluid flow lines.

A further object of this invention is to provide an improved force cup which, in effect, may be locked into engagement with a plumbing line.

In general, the principles and objects of this invention are accomplished in a force cup comprising essentially two portions. The first portion comprises a generally hemispherical bell-like member of rubber or the like having a closed end and an open end. The first portion has a generally smooth inner wall and a corrugated outer wall. The corrugations are annular in form and extend around the outer surface of the bell. Thus the wall of the bell portion has thick regions in the vicinity of the corrugations and thin regions between the corrugations. In use, the bell portion flexes at these thin regions. The open end of the bell-like first portion is provided with a circumferential lip which is provided with a concave depression extending around the entire length thereof. The lip is employed to form a suction connection with the wall of a hopper.

The force cup also includes, in combination with the bell portion, a guide portion which is joined to the bell portion adjacent to the open end thereof and which extends therefrom. The guide portion is tapered to a comparatively small opening and its wall is curved concave inwardly. The guide portion is employed to facilitate the seating of the force cup in any type and shape of trap opening.

The invention is described in greater detail by reference to the drawing wherein:

Figure 1 is a perspective view of the pressure device of the invention:

Figure 2 is a sectional elevational view of the device of Figure 1; and

Figure 3 is an elevational view of the device of Figure 1 and a portion of a plumbing fixture with which it may be employed.

Similar elements are designated by similar reference characters throughout the drawing.

Referring to Figures 1 and 2, a pressure device or force cup 10 embodying the principles of the invention comprises a bell-like portion 12 of resilient material such as rubber or the like. The inner wall 13 of the bell is substantially smooth and the outer wall thereof is provided with corrugations 14. Thus the wall of the bell portion is of variable thickness with thick portions in the vicinity of the corrugations 14 and thin portions 15 between the corrugations. When in use, the bell is compressed by an external force, it collapses in accordion fashion along the thin portions 15. When the force is released, the thick portions provide resiliency and promote the return of the bell to its normal expanded condition. Thus, the volume of the bell may be made larger than those of conventional plungers of the type described above. The bell 12 has a closed end 16 which is provided with a shank 18 to which an operating means, for example a handle 20, is connected by means of cooperating threads 21 or a universal joint or the like. The bell 12 also has an open end 22 which is bounded by a peripheral lip 24. The lip 24 is provided with a concave depression 26 extending along its entire length.

According to the invention, the plunger 10 is also provided with a guide portion 28 which comprises an extension from the open end 22 of the bell 12. The guide portion is connected to the bell portion in such a manner that the lip portion is flexible and is free to provide suction contact with the obstructed line with which the force cup is employed. Thus the guide portion is connected to the inner wall of the bell portion with the area of connection spaced a sufficient distance, for example one-half to three quarters of an inch, from the lip so that the lip remains flexible. The guide portion acts as a locking member and is resilient and plastically deformable and may be of the same material as the bell. In the vicinity of its connection to the bell, the guide portion and locking member 28 has an opening 30 of substantially the same diameter as the opening of the bell. From this opening, the guide portion tapers to a smaller opening 32. Between the two openings, the wall of the guide portion is curved concave inwardly. Such concave taper provides improved operation and adaptability of the guide portion of the plunger in plumbing lines of different diameters and of smaller diameters than might otherwise be possible. If the wall of the guide portion were convexly tapered, then, if it were inserted into a pipe having a particularly small diameter, the wall of the guide portion would collapse and constrict the opening therethrough.

The plunger 10 of the present invention is particularly suited for clearing obstructions from water closet hoppers. Referring to Figure 3, a typical hopper 34 includes a trap line 38 having an open end adapted to receive the plunger and from which the trap line bends abruptly and at a sharp angle in most hoppers. In employing the plunger 10 with the hopper of Figure 3, the guide and locking member 28, as the leading portion of the plunger, is directed into the trap opening of the hopper 34. Since the guide portion is resilient and is plastically deformable, it adjusts to the size and shape of the trap opening and with a slight downward pressure of the handle, the guide portion begins to be wedged in the trap opening. With further pressure on the handle a portion of the wall of the bell portion 12 begins to collapse in accordion fashion and, thereby, the guide portion and locking member follows the curve of the trap line and becomes firmly wedged in the trap opening.

At the same time that the guide and locking member is firmly wedged in position, the lip 24 is seated on the wall of the hopper above the trap opening and forms an air-tight suction seal with the hopper wall as shown. Thus the likelihood of splash-back and loss of pressure occurring during operation of the force cup is substantially eliminated. With the plunger thus seated and in effect, locked in position, a reciprocating force applied to the handle 20 alternately compresses and expands the corrugated wall of the bell and applies large pressure and suction forces upon the fluid in the trap opening and in the trap line whereby any obstruction is readily removed.

Thus, it can be seen that the force cup of the invention is readily adjustable and, in effect, locks into engagement with substantially any size and shape of trap opening. The force cup thus allows the application of pressure and suction forces to a trap line extending from a trap opening at substantially any angle.

What is claimed is:

A pressure device comprising a flexible bell-shaped generally hemispherical member terminating in a plane forming a large open end at substantially its maximum diameter, and a hollow substantially tubular flexible guide member having a large end and a small end, said large end of said guide member being secured to the inner wall of said bell-shaped member inwardly of the large open end thereof, said guide member extending from its area of attachment to said bell-shaped member outwardly beyond the plane of said large open end of said bell-shaped member and terminating in said small end, the portion of the bell-shaped member at said large open end set off by the attachment of said guide member defining a lip, said guide member thus being adapted to be inserted into a conduit and said lip being adapted to prevent the backsplash of water during operation.

References Cited in the file of this patent

UNITED STATES PATENTS

| | | |
|---|---|---|
| 188,850 | Bugbee | Mar. 27, 1877 |
| 219,428 | Armstead | Sept. 9, 1879 |
| 646,455 | Noppel | Apr. 3, 1900 |
| 646,668 | Noppel | Apr. 3, 1900 |
| 1,575,697 | Lessing | Mar. 9, 1926 |
| 1,644,436 | Locke | Oct. 4, 1927 |
| 1,925,984 | Novakovich | Sept. 5, 1933 |
| 2,042,372 | Watson | May 26, 1936 |
| 2,066,773 | Felice | Jan. 5, 1937 |
| 2,188,960 | Schubring | Feb. 6, 1940 |
| 2,463,458 | Freyn | Mar. 1, 1949 |
| 2,496,525 | Eggleston | Feb. 7, 1950 |

FOREIGN PATENTS

| | | |
|---|---|---|
| 451,902 | Germany | Nov. 4, 1927 |